United States Patent
Landis et al.

(10) Patent No.: US 6,872,753 B2
(45) Date of Patent: Mar. 29, 2005

(54) MANAGING HYDROGEN AND CARBON MONOXIDE IN A GAS TO LIQUID PLANT TO CONTROL THE $H_2$/CO RATIO IN THE FISCHER-TROPSCH REACTOR FEED

(75) Inventors: Stephen R. Landis, Katy, TX (US); Rafael L. Espinoza, Ponca City, OK (US); Sergio R. Mohedas, Ponca City, OK (US); Barbara A. Belt, Seabrook, TX (US); Vincent H. Melquist, Ponca City, OK (US); Ralph T. Goodwin, III, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 179 days.

(21) Appl. No.: 10/388,843

(22) Filed: Mar. 15, 2003

(65) Prior Publication Data

US 2004/0102532 A1 May 27, 2004

Related U.S. Application Data

(63) Continuation-in-part of application No. 10/303,606, filed on Nov. 25, 2002, now Pat. No. 6,797,252.

(51) Int. Cl.[7] .............................................. C07C 27/00
(52) U.S. Cl. ...................... 518/705; 700/702; 700/703; 700/706
(58) Field of Search ............................... 518/700, 702, 518/703, 705, 706

(56) References Cited

U.S. PATENT DOCUMENTS

| | | | |
|---|---|---|---|
| 3,702,886 A | 11/1972 | Argauer et al. | 423/328 |
| RE29,948 E | 3/1979 | Dwyer et al. | 208/110 |
| 5,431,855 A | 7/1995 | Green et al. | 252/373 |
| 5,500,149 A | 3/1996 | Green et al. | 252/373 |
| 5,628,931 A | 5/1997 | Lednor et al. | 252/373 |
| 5,654,491 A | 8/1997 | Goetsch et al. | 568/469.9 |
| 5,888,470 A | 3/1999 | Engler et al. | 423/650 |
| 5,925,799 A | 7/1999 | Stanley et al. | 585/259 |
| 5,980,596 A | 11/1999 | Hershkowitz et al. | 48/127.9 |
| 6,043,288 A | 3/2000 | DeGeorge et al. | 518/715 |
| 6,072,097 A | 6/2000 | Yokoyama et al. | 585/658 |
| 6,143,202 A | 11/2000 | Christensen et al. | 252/373 |
| 6,147,126 A | 11/2000 | DeGeorge et al. | 518/715 |
| 6,156,809 A | 12/2000 | Clark et al. | 518/719 |
| 6,402,989 B1 | 6/2002 | Gaffney | 252/373 |
| 6,409,940 B1 | 6/2002 | Gaffney et al. | 252/373 |

(Continued)

FOREIGN PATENT DOCUMENTS

| | | |
|---|---|---|
| DE | 3345064 A1 | 6/1985 |
| DE | 3345088 A1 | 6/1985 |

(Continued)

OTHER PUBLICATIONS

International Search Report (PCT/US2004/007912), Aug. 23, 2004, 5 pages.

(Continued)

Primary Examiner—J. Parsa
(74) Attorney, Agent, or Firm—Conley Rose P.C.

(57) ABSTRACT

The present invention provides a process for controlling the ratio of hydrogen to carbon monoxide in feed streams to reactors that convert syngas to hydrocarbon liquids. The process includes primary syngas production process for converting hydrocarbon gas to syngas comprising hydrogen and carbon monoxide. The process further includes introducing a hydrogen rich stream, a carbon monoxide rich stream, or both produced by an auxiliary source to a feed stream being passed to a reactor for converting the syngas to hydrocarbon liquid, thereby adjusting the $H_2$/CO ratio in the feed stream. Examples of reactors that may be used to convert syngas to hydrocarbon liquids are FT reactors staged in series and oxygenate producing reactors staged in series.

31 Claims, 3 Drawing Sheets

U.S. PATENT DOCUMENTS

| | | | |
|---|---|---|---|
| 6,512,018 B2 | 1/2003 | Kennedy | 518/715 |
| 2002/0006374 A1 | 1/2002 | Kourtakis et al. | 423/418.2 |
| 2002/0009407 A1 | 1/2002 | Kourtakis et al. | 423/418.2 |
| 2002/0032244 A1 | 3/2002 | Benham et al. | 518/715 |
| 2003/0040655 A1 | 2/2003 | Budin et al. | 585/627 |

FOREIGN PATENT DOCUMENTS

| | | |
|---|---|---|
| EP | 0269297 A1 | 6/1988 |
| EP | 1188713 A2 | 3/2002 |
| WO | WO 00/43336 | 1/2000 |
| WO | WO 0009441 | 2/2000 |
| WO | WO 0142175 A1 | 6/2001 |
| WO | WO 02/020395 | 3/2002 |

OTHER PUBLICATIONS

International Search Report (PCT/US2004/007913), Aug. 16, 2004, 4 pages.

International Search Report (PCT/US2004/007914), Aug. 16, 2004, 4 pages.

MANAGING HYDROGEN AND CARBON MONOXIDE IN A GAS TO LIQUID PLANT TO CONTROL THE H₂/CO RATIO IN THE FISCHER-TROPSCH REACTOR FEED

CROSS-REFERENCE TO RELATED APPLICATIONS

The present application is a continuation in part of U.S. patent application Ser. No. 10/303,606, filed Nov. 25, 2002 U.S. Pat. No. 6,797,252, entitled "Syngas Production with Adjustable Hydrogen to CO Ratio," incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

1. Field of the Invention

This invention generally relates to the conversion of hydrocarbon gas to hydrocarbon liquid. More specifically, the invention relates to a process for managing hydrogen and carbon monoxide in a gas to liquid plant to thereby control the ratio of hydrogen to carbon monoxide in feed streams to reactors that produce hydrocarbons.

2. Background of the Invention

Natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport. An alternative is to locally convert the natural gas to liquid hydrocarbon products that can be transported more cost effectively. Processes for converting light hydrocarbon gases, such as natural gas, to heavier hydrocarbon liquids are generally known in the art.

One such process commonly known as gas to liquids (GTL) involves the conversion of natural gas to synthesis gas (syngas) comprising hydrogen ($H_2$) and carbon monoxide (CO), followed by feeding the syngas to a reactor for conversion to hydrocarbons, primarily $C_5^+$ hydrocarbons via a hydrocarbon synthesis reaction such as the Fischer-Tropsch (FT) reaction. The hydrocarbon synthesis reaction produces hydrocarbon liquid effluent streams, including paraffins, oxygenates, and olefins having from about 5 to 100 or more carbon atoms in their molecules and a gas effluent stream comprising unreacted syngas and light gas products such as methane, ethane, propane, butane, other hydrocarbons including paraffins, oxygenates, and olefins, water vapor, and $CO_2$. Alternatively, the syngas can be converted to oxygenates such as methanol and dimethylether.

One way to make the above process more cost effective is to optimize simultaneously its selectivity towards desired products and the reaction rate. It is known in the art that high $H_2$/CO syngas feed ratios result in a high FT reaction rate, particularly when cobalt-based FT catalysts are used. Therefore, the overall costs of the process are reduced by reducing the necessary reactor volume needed to achieve a certain yield while the reverse occurs when using lower $H_2$/CO syngas feed ratios. On the other hand, the selectivity towards desired products (i.e., heavier hydrocarbons) is improved as the $H_2$/CO ratio in the syngas feed decreases. This means that both a high and a low $H_2$/CO syngas feed ratio have positive and negative effects in the performance of the FT process and that this process should be designed and operated in a balanced manner.

FIG. 1 illustrates the effect of the $H_2$/CO ratio at the reactor inlet and of the per pass CO conversion on the $H_2$/CO ratio at the exit of a FT reactor using a cobalt-based catalyst. It is to be understood that the usage ratio is the ratio of the net number of moles of $H_2$ reacted divided by the net number of moles of CO that reacted. In other words, the usage ratio is the number of moles of $H_2$ that disappeared from the system divided by the number of moles of CO that disappeared from the system. Plots A, B, and C represent the FT reaction being performed using three different $H_2$/CO ratios in the syngas feed to an FT reactor. For each $H_2$/CO ratio in the feed, the $H_2$/CO ratio at the reactor exit is plotted as a function of the CO conversion. The $H_2$/CO ratio at the reactor exit decreases for plot A (feed $H_2$/CO ratio=1.8) and increases for plot C (feed $H_2$/CO ratio=2.4) as the conversion of carbon monoxide increases. In contrast, the $H_2$/CO ratio remains constant for plot B, which has both a feed $H_2$/CO ratio and an effluent $H_2$/CO ratio of approximately 2.15. The usage ratio assumed in the example above is approximately 2.15, which is a typical expected usage ratio of a cobalt-based catalyst employed in a Fischer-Tropsh commercial scale reactor. This variation in the $H_2$/CO ratio increases the degree of difficulty to select and operate the FT reactors at optimum conditions.

In view of the foregoing, a need exists to have the ability to adjust the $H_2$/CO ratio in the syngas feed to achieve an optimum compromise between the FT reactio rate and the selectivity towards desired products.

SUMMARY OF THE INVENTION

The present invention is a process for controlling the ratio of hydrogen to carbon monoxide in feed streams to synthesis reactors that convert syngas to higher molecular weight hydrocarbons. Hydrocarbon synthesis reactors produce hydrocarbons which may be paraffinic hydrocarbons (saturated hydrocarbons), olefinic hydrocarbons (unsaturated hydrocarbons), oxygenates (oxygen-containing compounds), or any combination thereof. The $H_2$/CO ratio is controlled via the management of hydrogen and carbon monoxide recovered from the process itself and from other processes. The process includes converting hydrocarbon gas to syngas comprising hydrogen and carbon monoxide in a primary syngas production process, followed by passing the syngas to a synthesis reactor for conversion to, for example, hydrocarbons, methanol, or dimethylether. The synthesis reactor comprises one or more Fischer-Tropsch reactors or oxygenate-producing reactors. The process further includes adjusting the $H_2$/CO ratio in the feed streams by introducing a hydrogen rich stream, a carbon monoxide rich stream, or both produced by an auxiliary source to the feed streams.

In some embodiments, at least one of the following processes serves as the auxiliary hydrogen source: a physical and/or chemical process for treating at least a portion of the syngas produced in the primary syngas production process to obtain at least one product stream with a hydrogen concentration higher than the feed stream to this process; a secondary syngas production process for converting hydrocarbon gas to syngas; a process for converting hydrocarbons to olefins; a process for converting hydrocarbons to aromatics; and a process for converting hydrocarbons to carbon filaments. In some embodiments, at least one of the following processes serves as the auxiliary carbon monoxide source: a process for separating the carbon monoxide from at least a portion of the syngas produced in the primary syngas production process; a secondary syngas production process for converting hydrocarbon gas to syngas; and a process for converting hydrocarbon gas to olefins. In addition, the output from the auxiliary source undergoes a water-gas-shift reaction or separation or purification means such as, membrane separation, pressure swing absorption, or any combination thereof to produce the hydrogen rich stream, the carbon monoxide rich stream, or both.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
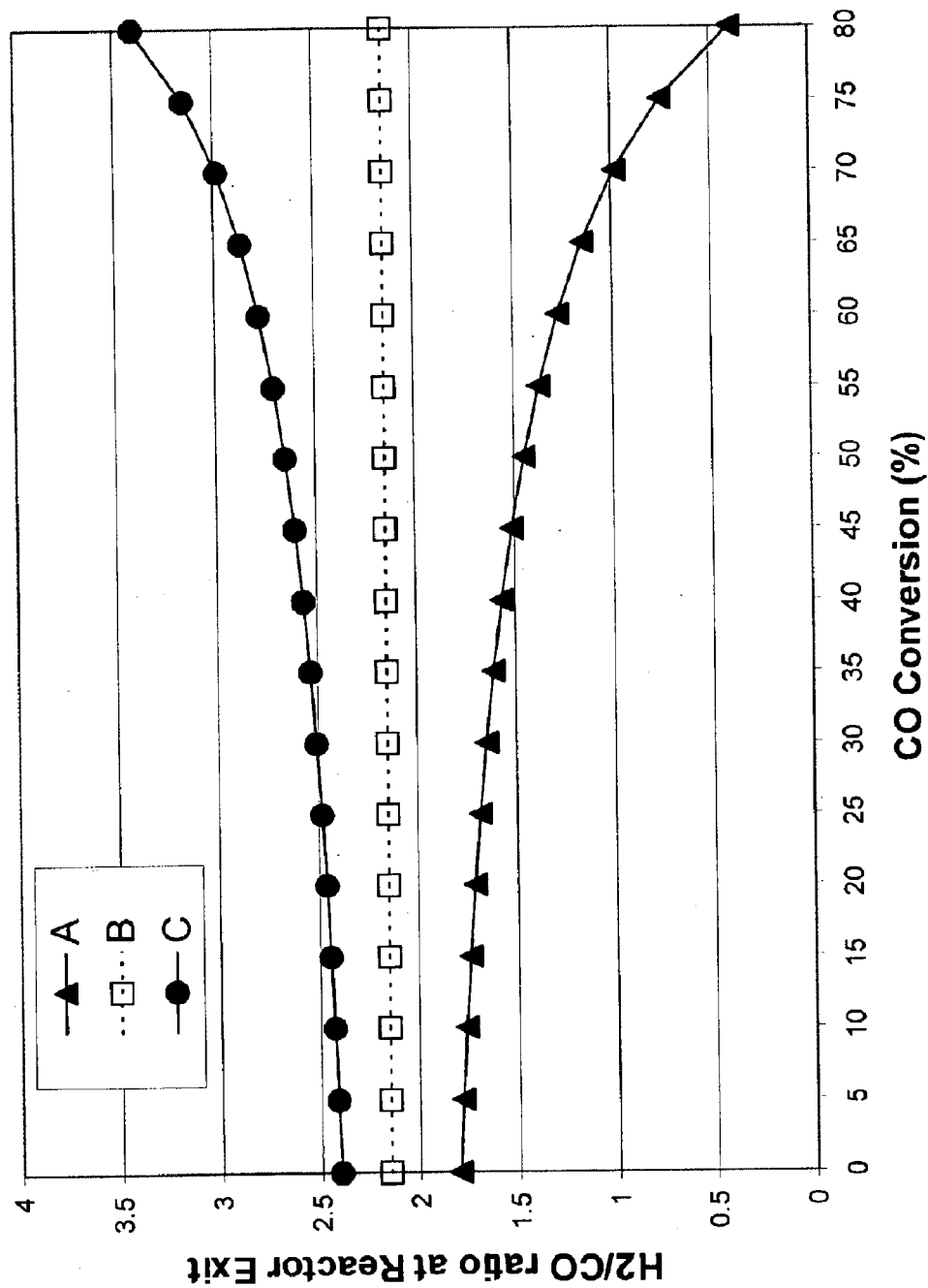
FIG. 1 is a graph in which the output $H_2/CO$ ratio of a Fischer-Tropsch reactor is plotted as a function of the conversion of carbon monoxide for three different feed $H_2/CO$ ratios.
Figure 2:
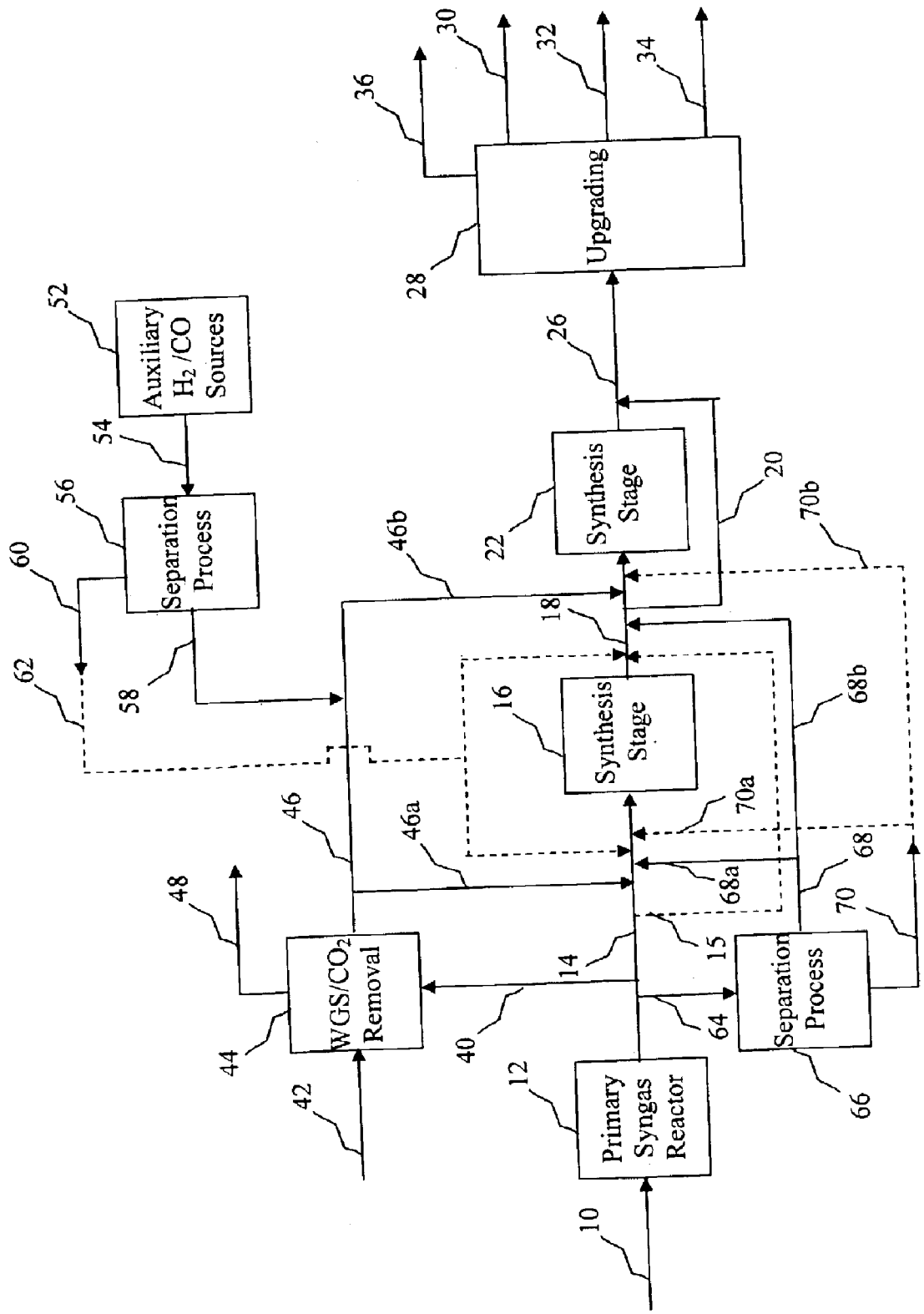
FIG. 2 is a simplified block flow diagram of an embodiment of the present invention, wherein hydrogen rich streams or carbon monoxide rich streams are introduced to feed streams to synthesis reactors in series.

FIG. 2 depicts an embodiment in which hydrogen rich streams and/or carbon monoxide rich streams from multiple sources are introduced to one or more of the feed streams to two synthesis stages 16 and 22 in series to produce liquid and/or gas products. The synthesis stages may be, for example, FT process stages, oxygenate producing process stages, or a combination thereof. As used herein, a process stage refers to a process stage comprising one or more reactors arranged in parallel, wherein a given conversion of syngas to products, e.g., hydrocarbons or oxygenates, is achieved. In a multi-stage process, a plurality of process stages are arranged in series such that a subsequent or downstream stage (e.g., synthesis stage 22) receives at least a portion of the unreacted reactants (e.g., syngas via stream 18) from a prior or upstream stage (e.g., synthesis stage 16) and further converts the unreacted reactants to liquids to increase the overall percent conversion of reactants as they pass from stage to stage until a final desired conversion percentage is obtained. Recycle streams may be subjected to separation and/or purification processes before re-entering the reactors to which the streams are being recycled. Furthermore, reaction conditions may vary from stage to stage, and the present invention addresses managing hydrogen and carbon monoxide in the feed to optimize operation of a multi-stage process. In alternative embodiments, the number of process stages may be optimized based on the desired throughput of the process. For example, synthesis process stages 16 and 22 may be replaced with a single process stage or with more than two process stages in series.

Introducing one or more hydrogen rich streams and/or one or more carbon monoxide rich streams to one or more of the feed streams of the synthesis stages allows the $H_2/CO$ ratio in those feed streams to be adjusted to their desired values. For example, the $H_2/CO$ ratio in the feed stream to the first stage may be less than the usage ratio, resulting in a lower $H_2/CO$ ratio in the effluent stream of the first stage. Thus, for a multi-stage process, the $H_2/CO$ ratio drops with each successive stage. One or more hydrogen rich streams can be introduced to the feed stream to the first stage, the feed stream to the second stage, the feed stream to any successive stage, or combinations thereof for the purpose of raising the $H_2/CO$ ratios to the usage ratio. On the other hand, if the $H_2/CO$ ratio in the feed stream to the first stage is greater than the usage ratio, it will result in a higher $H_2/CO$ ratio in the feed stream to the second stage. Consequently, in the case of a multistage process, the $H_2/CO$ ratio increases with each successive stage. One or more carbon monoxide rich streams can be introduced to the feed stream to the first stage, the feed stream to the second stage, the feed stream to any successive stage, or combinations thereof in an attempt to lower the $H_2/CO$ ratios to the usage ratio. Examples of various sources of hydrogen rich streams and carbon monoxide rich streams are presented below.

As shown in FIG. 2, the primary syngas unit 12 produces the majority or bulk of the syngas feed to the multi-stage synthesis process, whereas other auxiliary syngas producing units primarily function to provide syngas (or components therein) to be used to adjust the $H_2/CO$ ratio in the feed. In alternative embodiments, the primary syngas unit may comprise one or more syngas production processes capable of converting hydrocarbons to syngas, such as a steam reformer, an auto-thermal reformer, a partial oxidation (CPOX) reactor, or combinations thereof. Steam reforming (SR) entails endothermically reacting light hydrocarbons and steam over a catalyst contained within a plurality of externally heated tubes mounted in a furnace. Auto-thermal reforming (ATR) employs a combination of steam reforming and partial oxidation. More particularly, the endothermic heat required for the steam reforming reaction is obtained from the exothermic partial oxidation reaction. In a preferred embodiment described in more detail herein, the primary syngas unit is a CPOX reactor and will be referred to as CPOX reactor 12.

As shown in FIG. 2, a feed stream 10 comprising a mixture of at least one hydrocarbon and oxygen ($O_2$) is passed to CPOX reactor 12. Feed stream 10 is substantially free of carbon dioxide ($CO_2$), meaning that it comprises less than about 10% $CO_2$ by volume, preferably less than about 5% $CO_2$ by volume. Feed stream 10 preferably comprises primarily $C_1$ to $C_5$ hydrocarbons, preferably at least 50% methane, and more preferably at least 80% methane, that has been separated from other components of a natural gas stream in a gas plant (not shown). The oxygen contained within feed stream 10 is preferably pure oxygen; however, it may alternatively comprise another source of oxygen, e.g., air, oxygen-enriched air, oxygen mixed with an inert gas (i.e., a diluent), and so forth. The gases in feed stream 10 are typically pre-heated, mixed, and passed over or through a catalyst bed disposed within CPOX reactor 12, which preferably is a short-contact time reactor (SCTR) such as a millisecond contact time reactor. Suitable SCTR's are described in U.S. Pat. Nos. 6,409,940 and 6,402,989. The methane (or other hydrocarbon) and the oxygen contained in feed stream 10 are converted to syngas upon contact with the catalyst bed. Partial oxidation of methane proceeds by the following exothermic reaction:

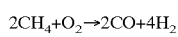

The CPOX reactor 12 contains any suitable partial oxidation catalyst for promoting the conversion of methane (or other hydrocarbon) to syngas. Partial oxidation catalysts are well known to those skilled in the art. Partial oxidation catalysts typically comprise a catalytically active metal on a support structure. Exemplary catalytically active metals include palladium, platinum, rhodium, iridium, osmium, ruthenium, nickel, chromium, cobalt, cerium, lanthanum, and mixtures thereof. The support structure often dictates the type of catalyst bed that may be used. For example, fixed beds typically comprise monoliths and large particle sized supports, and small particle sized supports tend to be more useful in fluidized beds.

Within CPOX reactor 12, feed stream 10 is contacted with the catalyst in a reaction zone that is maintained at conversion-promoting conditions effective to produce $H_2$ and CO. Preferably, CPOX reactor 12 is operated at relatively mild conditions to avoid the formation of unwanted by-products. Suitable partial oxidation processes, conditions, and catalysts for use with the present invention are disclosed in, for example, U.S. Pat. Nos. 6,402,989 and 6,409,940; published PCT application WO 02/20395; and published U.S. Pat. Applications 2002-0006374 and 2002-0009407, each of which is incorporated herein by reference in its entirety. A syngas stream 14 primarily comprising $H_2$ and CO is recovered from CPOX reactor 12. Oxygen, carbon dioxide, water, and light hydrocarbons may also be present in syngas stream 14.

Referring to FIG. 2, syngas feed stream 14 is passed to a synthesis process, comprising a first synthesis stage 16 in series with and upstream from a second synthesis stage 22, to produce hydrocarbons. Syngas feed stream 14 is passed directly to first synthesis stage 16, allowing this stage to receive freshly produced syngas. Optionally, a slipstream 15 of syngas feed stream 14 may be passed to second synthesis stage 22 such that it also receives freshly produced syngas. Effluent streams 18 and 26 exit synthesis stages 16 and 22, respectively. Effluent stream 18 serves as the feed to second synthesis stage 22. Also, a slipstream 20 of effluent stream 18 is passed directly to effluent stream 26, bypassing FT process stage 22.

In a preferred embodiment, the synthesis process is an FT process, and synthesis stages 16 and 22 will be referred to as FT process stages 16 and 22, respectively. The feed gases charged to the FT process comprise hydrogen, or a hydrogen source, and carbon monoxide. As described previously, $H_2/CO$ mixtures suitable as feedstock to the FT process can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to carbon dioxide and hydrogen for use in the FT process. It is preferred that the molar ratio of hydrogen to carbon monoxide in feed stream 14 be greater than 0.5:1 (e.g., from about 0.67:1 to about 2.5:1). Preferably, when cobalt, nickel, and/or ruthenium catalysts are used for the FT synthesis, feed stream 14 contains a concentration of hydrogen and carbon monoxide in a molar ratio of from about 1.6:1 to about 2.3:1. Preferably, when iron catalysts are used, feed gas stream 14 contains hydrogen and carbon monoxide in a molar ratio of from about 1.4:1 to about 2.3:1. Feed gas stream 14 should contain only a low concentration of compounds or elements that have a deleterious effect on the catalyst such as poisons. For example, feed gas stream 14 may need to be pretreated to ensure that it contains low concentrations of sulfur or nitrogen compounds such as hydrogen sulfide, hydrogen cyanide, ammonia, and carbonyl sulfides.

The FT reactors within each process stage preferably contain any suitable catalyst for promoting the conversion of $H_2$ and CO to hydrocarbons. The FT catalyst includes an active catalyst component either unsupported or supported on a material. The support material (also known as the catalyst support) may be a porous material that provides mechanical support for the active catalyst component. Examples of suitable support materials include boehmite and refractory oxides such as silica, alumina, titania, thoria, zirconia, or mixtures thereof such as silica-alumina. Other examples of suitable support materials are aluminum fluorides and fluorided alumina. The active catalyst component comprises at least one metal from Groups 8, 9, or 10 of the Periodic Table (based on the new IUPAC notation). Preferably, the active catalyst component is iron, cobalt, nickel, ruthenium, or mixtures thereof. The amount of active catalyst component present in the catalyst may vary. For instance, the supported catalyst may comprise about 1 to 50% by weight of the metal component per total weight of the metal component and support material, preferably from about 5 to 40% by weight, and more preferably from about 10 to 35% by weight. In addition, the FT catalyst may also comprise one or more promoters known to those skilled in the art. Suitable promoters include Group 1 metals, Group 2 metals, Group 3 metals, Group 4 metals, Group 5 metals, and Group 11 metals. Typically, at least a portion of the metal is present in a reduced state (i.e., in the metallic state). Therefore, the FT catalyst is preferably activated prior to use by a reduction treatment.

During the FT conversion process, the reaction zones of the FT reactors are maintained at conversion-promoting conditions effective to produce the desired hydrocarbons. The Fischer-Tropsch process is typically run in a continuous mode. In this mode, the gas hourly space velocity through the reaction zone typically ranges from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (1 atm or 101 kPa) and temperature (0° C. or 273.16 K). The reaction zone volume is defined by the portion of the reaction vessel volume where the Fischer-Tropsch reaction takes place and which is occupied by a gaseous phase comprising reactants, products and/or inerts; a liquid phase comprising liquid/wax products and/or other liquids; and a solid phase comprising catalyst. The reaction zone temperature is preferably in the range of from about 160° C. to about 300° C., more preferably from about 190° C. to about 260° C. The reaction zone pressure is preferably in the range of about 80 psia (552 kPa) to about 1000 psia (6895 kPa), more preferably from 80 psia (552 kPa) to about 600 psia (4137 kPa), and still more preferably from about 140 psia (965 kPa) to about 500 psia (3447 kPa).

Any suitable reactor configuration or mechanical arrangement that allows contact between the syngas and the catalyst may be employed for the FT reactors. Examples of suitable FT reactors include slurry-bubble reactors, fixed bed reactors such as tubular reactors, and multiphase reactors with a stationary catalyst phase. In a slurry-bubble reactor, the FT catalyst particles are suspended in a liquid, e.g., molten hydrocarbon wax, by the motion of bubbles of syngas sparged into the bottom of the reactor. As the gas bubbles rise through the reactor, the syngas is absorbed into the liquid where it diffuses to the catalyst for conversion to hydrocarbons. Gaseous products and unconverted syngas enter the gas bubbles and are collected at the top of the reactor. Liquid products are recovered from the suspending liquid using different techniques such as filtration, settling, hydrocyclones, and magnetic techniques. Cooling coils immersed in the slurry remove heat generated by the reaction. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. Multiphase reactors having a stationary catalyst phase are described in U.S. patent application Ser. No. 10/238,008, filed Sep. 9, 2002, entitled "Gas Agitated Multiphase Reactor with Stationary Catalyst Solid Phase," which is incorporated by reference herein in its entirety.

In the FT process, $H_2$ and CO combine in a polymerization-like fashion to form various components, e.g., liquid hydrocarbon compounds, gas hydrocarbon compounds, $H_2O$, $CO_2$, and unreacted $H_2$ and CO. In FIG. 2, each FT process stage 16 and 22 produces hydrocarbon compounds having varying numbers of carbon atoms. An effluent stream 26 produced by the multi-stage FT process comprises liquid compounds such as hydrocarbon liquids, including paraffins, oxygenates, and olefins having from about 5 to 100 or more carbon atoms in their molecules. A gas effluent stream not shown in the figure also exits from each FT process stage. The gas effluent stream comprises unreacted syngas and light gas products such as methane, ethane, propane, butane, other hydrocarbons including paraffins, oxygenates, and olefins, water vapor, and $CO_2$.

Figure 3:
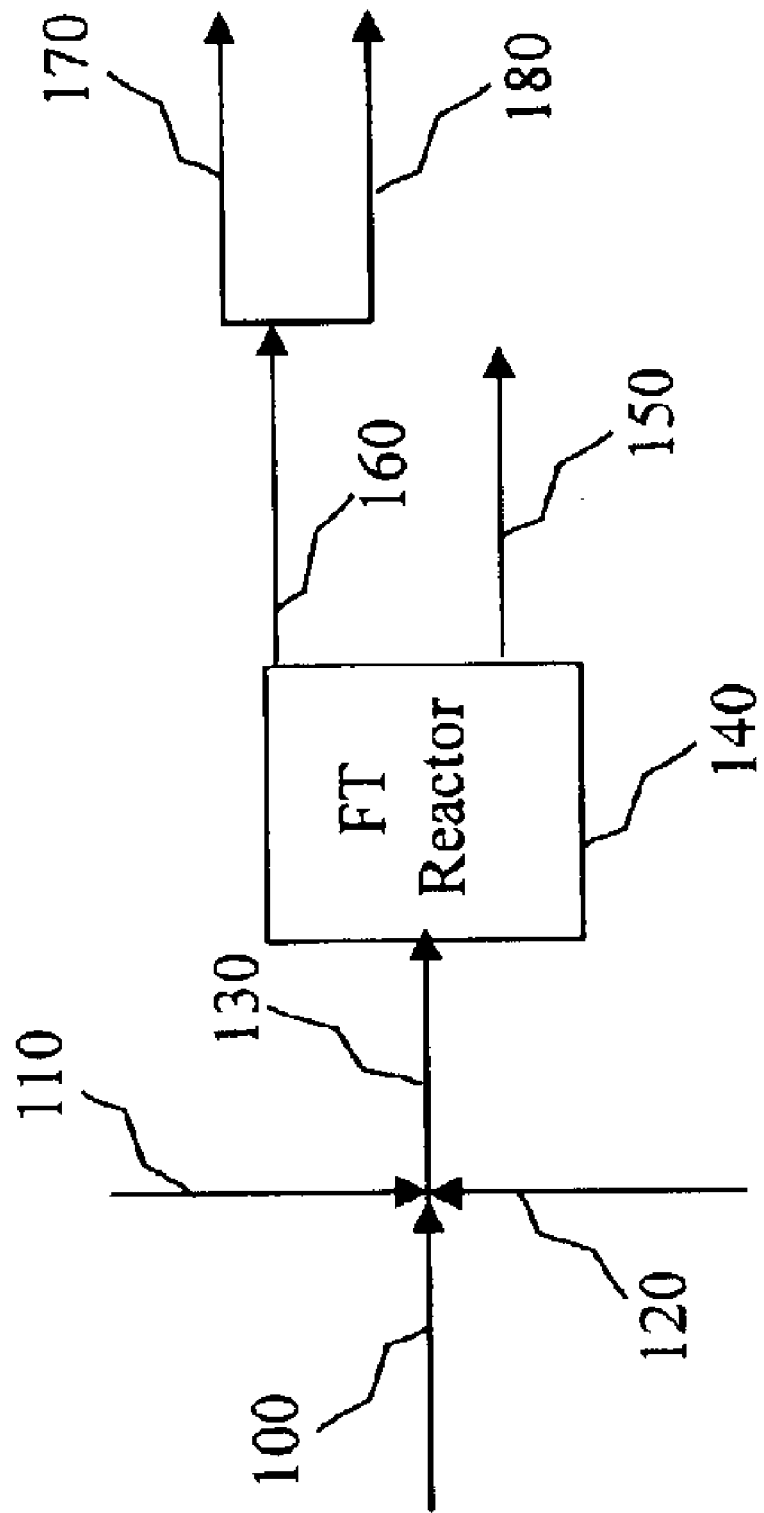
FIG. 3 depicts a Fischer-Tropsch reactor of the process shown in FIG. 2 and its feed and effluent streams, wherein portions of a gas effluent stream recovered from the Fischer-Tropsch reactor may be fed to another Fischer-Tropsch reactor, a unit other than a Fischer-Tropsch reactor, and back to the same Fischer-Tropsch reactor.

FIG. 3 depicts an exemplary FT reactor 140 that could be used in either one of the synthesis stages 16 and 22 in FIG. 2. In particular, the feed streams to and the effluent streams from FT reactor 140 are shown in detail. As described previously, a syngas stream 100 recovered from a primary syngas production reactor and primarily comprising $H_2$ and CO is provided for use as feedstock to FT reactor 140. The ratio of $H_2$ to CO in syngas stream 100 may not be desirable if it is too lean in one component (i.e., $H_2$ or CO). Stream 110 may comprise a portion of a gas effluent of a Fischer-Tropsch reactor other than FT reactor 140, a portion of the gas effluent of FT reactor 140, i.e., stream 160 (this portion of 160 is not shown in the figure), or a combination of both. Thus, a portion of the gas effluent stream 160 may be recycled from FT reactor 140 and introduced to syngas stream 100. A second stream 120 that is rich in the lean component of syngas stream 100 may also be introduced to syngas stream 100 to adjust the $H_2$/CO ratio therein to a desired value, typically closer to the value of the usage ratio in the FT reactor. An adjusted reactant stream 130 formed by mixing syngas stream 100, stream 120, and stream 110 is fed to FT reactor 140. The FT reactor 140 produces a liquid effluent stream 150 comprising hydrocarbons and a gas effluent stream 160 comprising unreacted syngas and light gas products such as methane, ethane, propane, butane, and other hydrocarbons including paraffins, oxygenates, and olefins, water vapor, and $CO_2$. Gas effluent stream 160 can be directed to the feed stream of any FT reactor. For example, as mentioned above, a first portion 110 of gas effluent stream 160 can be recycled back to FT reactor 140. Also, a second portion 170 of gas effluent stream 160 can be sent or recycled to another FT reactor, e.g., an FT reactor in series with FT reactor 140. In addition, a third portion 180 of gas effluent stream can be sent to a unit other than a Fischer-Tropsch reactor. The foregoing recycle streams may be subjected to separation and/or purification processes before entering the FT reactor to which it is being recycled or before being sent to any other unit. More information related to recycling of the Fischer-Tropsch off gas may be found in U.S. patent application Ser. No. 10/299,193, filed Nov. 19, 2002, entitled "The Production of Synthesis Gas from a Feed Stream Comprising Hydrogen," which is incorporated by reference herein in its entirety.

Turning back to FIG. 2, effluent stream 26, which comprises the liquid hydrocarbons produced by the FT process, is fed to a refining or upgrading process 28 to form additional products. A suitable refining/upgrading process is disclosed in the co-owned U.S. Patent Application entitled "Methods for Treating Organic Compounds and Treated Organic Compounds," filed Mar. 5, 2003, which is incorporated herein by reference in its entirety. Refining or upgrading process 28 may include, for example (not individually shown), a hydrotreater, a hydrocracker, a separation unit such as a fractionator, and combinations thereof. In one possible embodiment of the product upgrading process, the hydrocarbons are subjected to hydrogenation in the hydrotreater, and then the products of the hydrotreater are sent to a fractionation tower. The heavy products exiting the bottom of the fractionation tower are then fed to a hydrocracker in the presence of $H_2$ to form lower average molecular weight hydrocarbon products, wherein "hydrocarbon products" refers to materials that can be used as components of mixtures known in the art of at least one of naphtha (represented by stream 30), diesel (stream 34), kerosene (stream 32), jet fuel, lube oil and wax. The hydrocarbon product streams are essentially free of sulfur. Thus, the diesel stream may be used to produce environmentally friendly, sulfur-free fuels and/or blending stocks for fuels by using as is or blending with higher sulfur fuels. A light off gas stream 36 recovered from upgrading process 28 may be recycled to CPOX reactor 12, as described in U.S. patent application Ser. No. 10/299,193, filed Nov. 19, 2002, entitled "The Production of Synthesis Gas from a Feed Stream Comprising Hydrogen," which is incorporated by reference herein in its entirety.

Various embodiments and various arrangements of hydrocracker, hydrotreater(s) and fractionator(s) in an FT product upgrading section, which are suitable for use in upgrading process 28, are disclosed in the co-owned U.S. patent application entitled "Methods for Treating Organic Compounds and Treated Organic Compounds," filed Mar. 5, 2003. Suitable conditions for hydrocracking and hydrotreating a hydrocarbon stream derived from Fischer-Tropsch synthesis are described below.

As used herein, "hydrotreating" means treating a hydrocarbon stream with hydrogen without making any substantial change to the carbon backbone of the molecules in the hydrocarbon stream. For example, hydrotreating a hydrocarbon stream comprising predominantly $H_2C=CH-CH_2-CH_2-CH_3$ would yield a hydrocarbon stream comprising predominantly $CH_3-CH_2-CH_2-CH_2-CH_3$. Hydrotreating a hydrocarbon stream derived from Fischer-Tropsch synthesis can take place with hydrotreating catalysts comprising at least one of the following metals: molybdenum (Mo), tungsten (W), nickel (Ni), palladium (Pd), platinum (Pt), ruthenium (Ru), iron (Fe), and cobalt (Co). Hydrotreating catalysts, such as those comprising Ni, Pd, Pt, Ni—W, Ni—Mo, Co—W, or Co—Mo, may be operated at a temperature of from about 320° F. to about 800° F. (from about 160° C. to about 425° C.). Additionally, other parameters such as the pressure and liquid hourly space velocity may be varied by one of ordinary skill in the art to effect the desired hydrotreating. Preferably, the hydrogen partial pressure is in the range of from about 100 psia to about 2,000 psia (from about 690 kPa to about 13,800 kPa). The liquid hourly space velocity is preferably in the range of from about 1 to about 10 hr$^{-1}$, more preferably from about 0.5 to about 6 hr$^{-1}$. Other specific hydrotreating conditions pertaining to ultra-low severity hydrotreating of a hydrocarbon stream derived from Fischer-Tropsch synthesis, which can be used for this application, are disclosed in the co-owned U.S. Patent Application entitled "Methods for Treating Organic Compounds and Treated Organic Compounds," filed Mar. 5, 2003.

As used herein, "hydrocracking" means splitting an organic molecule and adding hydrogen to the resulting molecular fragments to form two smaller hydrocarbons (e.g., $C_{10}H_{22}+H_2\rightarrow C_4H_{10}$ and skeletal isomers+$C_6H_{14}$ and skeletal isomers). Because a hydrocracking catalyst can be active in hydroisomerization, there can be some skeletal isomerization during the hydrocracking step; therefore, isomers of the smaller hydrocarbons can be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 260° C. to about 400° C.) and at a hydrogen partial pressure of from about 500 psia to about 1,500 psia (from about 3,400 kPa to about 10,400 kPa). Specific hydrocracking conditions, which can be used for this application, pertaining to hydrocracking in conjunction with ultra-low severity hydrotreating of a FT stream are disclosed in the co-owned U.S. Patent Application entitled "Methods for Treating Organic Compounds and Treated Organic Compounds," filed Mar. 5, 2003.

In alternative embodiments, the synthesis process shown in FIG. 2 may be any known process suitable for converting syngas to useful products such as alcohols and/or other oxygen containing compounds. For example, synthesis stages 16 and 22 may be methanol process stages 16 and 22, each comprising one or more reactors typically arranged in parallel. The methanol process stages are arranged in series such that the conversion of syngas to methanol is progressively increased from stage to stage. In particular, methanol is synthesized by reacting $H_2$ and CO in the presence of a catalyst composition, preferably in fluidized bed reactors, according to the following exothermic reaction:

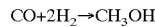

The methanol reactors may contain any suitable catalyst for promoting the conversion of syngas to methanol, and the reaction zone within those reactors is maintained at conversion-promoting conditions effective to produce methanol. Alternatively, other alcohol producing processes, e.g., an iso-propanol process, may be added to or substituted for methanol process stages 16 and 22, and any suitable number of methanol process stages, including a single methanol process stage, may be employed instead of the two methanol process stages.

The methanol may be produced at a reaction temperature of about 200° C. to 300° C. and at a reaction pressure of about 20 to 150 atm. This so-called low pressure methanol method employs copper-containing catalysts, such as copper oxide, copper chromite, and Raney copper-zinc catalyst for the reaction. Examples of this low pressure methanol method can be found in U.S. Pat. Nos. 4,149,940 and 6,028,119, which are fully incorporated by reference herein. U.S. Pat. No. 6,028,119 describes the synthesis of methanol in the presence of a metal alkoxide and a Raney copper in which the copper content is in the range of 80.0 to 99.9 wt. %. U.S. Pat. No. 4,149,940 discloses the use of a catalyst containing copper, zinc oxide, and one or more other oxides, such as those of aluminum, chromium, and vanadium. Other suitable catalysts would be apparent to a person of ordinary skill in the art. Alternatively, a high pressure methanol method may be used to produce methanol at a reaction temperature of at least 300° C. and a pressure of at least 100 atm, wherein the catalyst primarily contains an oxide of, e.g., Cr and/or Zn.

Crude liquid methanol that typically contains various impurities, e.g., water, ethanol, butanol, ketones, ethers, and esters, is produced by methanol process stages 16 and 22. A light off gas containing, e.g., unreacted $H_2$ and CO, also exits the methanol process (not shown). The crude methanol is fed by stream 26 to a refining process 28 to obtain a purified methanol stream. For example, the crude methanol may be subjected to a distillation process like the one described in U.S. Pat. No. 4,744,869, which is fully incorporated by reference herein. In that process, the crude methanol is introduced to a first rectifying column and distilled with or without the addition of water to remove low-boiling components from the top of the column. It is then distilled in a second rectifying column to recover purified methanol from the top and mainly water from the bottom. Additional descriptions of the production of methanol can be found in U.S. Pat. No. 5,998,489, U.S. Pat. No. 5,827,901, U.S. Pat. No. 5,216,034, and U.S. Pat. No. 3,950,369, each of which is incorporated by reference herein in its entirety.

Referring to FIG. 2 in the context of a preferred embodiment wherein the primary syngas reactor is CPOX reactor 12 and the synthesis stages are FT process stages 16 and 22, auxiliary sources of $H_2$ or CO are introduced to feed streams 14 and 18 of the synthesis process. In this manner, the desired ratios of $H_2$/CO in those feed streams can be achieved. One way of forming the auxiliary sources is by sending slipstreams of stream 14, which comprises CO and $H_2$ to purification and/or separation processes. For example, a slipstream 40 of stream 14 may be passed to a secondary unit 44 for carrying out a water gas shift (WGS) reaction and a $CO_2$ removal process. The slipstream 40 may undergo various known treatments prior to introduction to secondary unit 44. A feed stream 42 containing steam ($H_2O$) is also passed to secondary unit 44 for reaction with the CO to form $H_2$ and carbon dioxide ($CO_2$) via a WGS reaction.

A WGS reaction is one in which CO reacts with $H_2O$ in the presence of a catalyst to produce $CO_2$ and $H_2$ in accordance with the following exothermic WGS reaction:

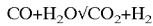

The WGS reactor of secondary unit 44 is preferably operated at a temperature in the range of from about 200° C. to about 1100° C., more preferably from about 200° C. to about 450° C. The temperature selected depends on the WGS catalyst composition, the amount of conversion desired, and the temperature of the incoming reactant gases. Typically, the lower the temperature, the higher the concentration of $H_2$ at equilibrium conditions. The WGS reactor can also be operated at a pressure in the range of from about 1 atmosphere to about 300 atmospheres. Any known catalyst suitable for promoting the WGS reaction may be disposed in the WGS reactor. Examples of such catalysts include, but are not limited to, iron based catalysts such as $Fe_3O_4/Cr_2O_3$ and copper based catalysts such as $CuO/ZnO/Al_2O_3$. The Cu based catalysts are low temperature type catalysts but tend to be unstable. The preferred operation temperature range for Cu based catalysts is from 180° C. to about 260° C. Above that range, the catalysts start to deactivate due to sintering of the active component, Cu. The Fe based catalysts' are very stable but have lower activities that require higher temperatures. The preferred operation temperature range for Fe based catalysts is from about 300° C. to about 550° C. Syngas stream 14 typically exits primary syngas reactor 12 at a temperature greater than 900° C. This temperature is typically immediately reduced to about 600° C. Accordingly, a more preferred embodiment comprises passing syngas slipstream 40 over a Fe based catalyst maintained at from about 300° C. to about 560° C. and then over a Cu based catalyst maintained at about 180° C. to about 260° C. to achieve the a higher hydrogen yield.

The effluent stream recovered from the WGS reactor comprises $H_2$, $CO_2$, and unreacted CO. The $CO_2$ will not have a deleterious effect on the Fischer-Tropsch or other downstream reaction; thus, the entire effluent stream may be introduced into syngas streams 14 and/or 18 to produce adjusted syngas streams. In a preferred embodiment shown in FIG. 2, the $CO_2$ can also be removed from the effluent stream of the WGS reactor to form a hydrogen rich stream 46 and a $CO_2$ rich stream 48. The $CO_2$ may be removed from the effluent stream via any known $CO_2$ removal or scrubbing process, such as membrane separation, or with an amine system. The WGS reactor followed by a $CO_2$ removal unit, all combined in secondary unit 44, produces a hydrogen rich stream 46 with a $H_2/CO$ ratio greater than the feed to secondary unit 44. Hydrogen rich stream 46 is substantially free of carbon dioxide $CO_2$, meaning that it comprises less than about 10% $CO_2$ by volume, preferably less than about 5% $CO_2$ by volume.

Syngas stream 14 typically needs to be transitioned to be useable in a Fischer-Tropsch or other synthesis reactor, which operates at lower temperatures of about 200° C. to 400° C. The syngas is preferably cooled, dehydrated (i.e., taken below 100° C. to knock out water), and compressed during the transition phase. Within a given stage of the FT process, if the $H_2/CO$ ratio at the inlet is lower than the usage ratio for that particular stage, then the $H_2/CO$ ratio at the outlet of the stage is lower than the $H_2/CO$ ratio at the inlet of the stage. Thus, a preferred embodiment is to increase the $H_2$ content of syngas feed streams 14 and/or 18 (i.e., increase the $H_2/CO$ ratio) by adding $H_2$ from hydrogen rich stream 46 via streams 46a and/or 46b, respectively. The $H_2/CO$ ratios in syngas streams 14 and 18 are preferably adjusted to a value in the range of from about 1.5 to about 3.0, and more preferably from about 1.7 to about 2.4, this value being dependant on the type of catalyst and the process conditions utilized in the FT process.

It should be appreciated that many variations or additions can be incorporated that would be obvious to one skilled in the art. For example, slipstream 40 of syngas stream 14 may be used for purposes other than as a feed to secondary unit 44. In addition, a slipstream of hydrogen rich stream 46 from secondary unit 44 may be delivered to other sections of the process such as a hydrogen rich supply gas.

Auxiliary sources of $H_2$ and CO can be formed by sending a portion of syngas stream 14 via slipstream 64 to a separation process 66. Separation process 66 preferably includes one or more physical separation units such as a pressure swing absorption (PSA) unit, a membrane separation unit, or a combination thereof, which are known in the art. A hydrogen rich stream 68 and a carbon monoxide rich stream 70 are recovered from separation process 66. Hydrogen rich stream 68 comprises greater than about 80% by volume $H_2$ per total volume of the stream, preferably greater than about 85% by volume $H_2$ per total volume of the stream, and more preferably greater than about 90% by volume $H_2$ per total volume of the stream. If $H_2$ is needed to raise the $H_2/CO$ ratio in syngas streams 14 and/or 18, hydrogen rich stream 68 can be introduced to syngas streams 14 and/or 18 via streams 68a and 68b, respectively. In an alternative embodiment in which the initial $H_2/CO$ ratio in the feed stream to the synthesis process is greater than the usage ratio of the synthesis catalyst, the $H_2/CO$ ratio of the effluent stream from each successive stage will increase. In this case, additional CO is required to lower the $H_2/CO$ ratios in syngas streams 14 and 18. This additional CO may be provided to syngas streams 14 and/or 18 from carbon monoxide rich stream 70 via streams 70a and 70b, respectively.

As needed, various other auxiliary sources of $H_2$ and CO (process unit 52) can be used singly or in combination to adjust the $H_2/CO$ ratios in syngas streams 14 and/or 18. Examples of other auxiliary $H_2/CO$ sources 52 include a secondary syngas production process, e.g., a CPOX process, an ATR process, an SR process such as a steam methane reforming (SMR) process, an SR process followed by a WGS process and optionally followed by a $CO_2$ removal process, or a combination thereof; a carbon filament (CF) production process; an aromatic production process; an olefin production process such as hydrocarbon cracking, oxidative dehydrogenation, dehydrogenation, petroleum refining processes, and the like; and combinations thereof. The CPOX process, the ATR process, and the SR process have been described previously in the specification, and the various other auxiliary processes are described below.

The CF process mentioned above involves feeding hydrocarbons, preferably ethane and propane recovered from a gas plant, to a carbon filament reactor for catalytic conversion to carbon filaments. Hydrogen is formed as a by-product of the catalytic reaction. The CF reactor contains any suitable catalyst for promoting the growth of carbon filaments from hydrocarbons. The CF catalyst is preferably a metal catalyst, which is defined herein as comprising elemental iron, nickel, cobalt, or chromium; alloys comprising the foregoing metals; oxides of the forgoing metals and alloys; and combinations of the foregoing metals, alloys, and oxides. The CF catalyst may be formed into any appropriate structure such as a wire, gauze, mesh, sheets, spheres, rods, or coated supports. Preferred CF catalysts include Ni gauze, a nickel-copper alloy screen or wire known as MONEL alloy 400, which is commercially available from Marco Specialty Steel Inc., and a nickel-chromium alloy known as Nichrome, which is commercially available from Parr Instruments, Inc.

The CF reactor is configured to support the chosen CF catalyst and to accommodate harvesting of the carbon filaments upon completion of their growth cycle. The CF reactor is further configured such that the carbon filaments can be removed from the metal catalyst and/or reactor vessel. While CF reactor may be a batch reactor, it is preferably a continuous reactor such as the one shown in FIG. 6 of Tibbetts, *Vapor Grown Carbon Fibers*, NATO ASI Series E: Applied Sciences, Vol. 177, pp. 78 (1989). Within the CF reactor, the reaction zone is maintained at conversion-promoting conditions effective to produce carbon filaments. The process is operated at atmospheric or slightly elevated pressures. Depending on the catalyst arrangement, preheating the feed gas may be preferred over preheating the catalyst. The temperature of the gases contacting the catalyst preferably ranges from about 350° C. to about 1,000° C., more preferably ranges from about 450° C. to about 800° C., and most preferably ranges from about 550° C. to about 700° C. The gas hourly space velocity preferably ranges from about 1,000 $hr^{-1}$ to about 100,000 hr$^{-1}$, more preferably from about 5,000 hr$^{-1}$ to about 50,000 hr$^{-1}$ and most preferably from about 10,000 hr$^{-1}$ to about 30,000 hr$^{-1}$.

Further aspects of the carbon filament production process employed for the present invention can be found in U.S. patent application Ser. No. 10/263,315, filed Oct. 1, 2002, entitled "Process for Converting Alkanes to Carbon Filaments," which is incorporated by reference herein in its entirety.

The aromatic production process mentioned above converts light hydrocarbons such as methane to aromatics via a non-oxidative catalytic reaction. Aromatic hydrocarbons, such as benzene, xylenes, naphthalene, and hydrogen, are formed in an aromatic production reactor. The catalyst contained in the reactor preferably comprises a crystalline aluminosilicate molecular sieve. The external surface acidity of this crystalline aluminosilicate is eventually selectively passivated by means of an amorphous silica layer. The molecular sieve may be, e.g., a pentasil crystalline aluminosilicate. As used herein, pentasil refers to a class of shape-selective molecular sieves. Of the class of pentasil crystalline aluminosilicates, the preferred aluminosilicates are ZSM-5, ZSM-8, ZSM-11, ZSM-23 and ZSM-35, with ZSM-5 being particularly preferred. The ZSM-5 molecular sieve is a coarse crystalline, three-dimensional, stable structure consisting of two sets of intersecting channels through 10-membered ring windows, one straight (5.3×5.6 A) and the other sinusoidal (5.1×5.5 A). This aluminosilicate may be represented by the general formula:

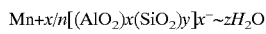

$$M_{n+x/n}[(AlO_2)x(SiO_2)y]x^- \sim zH_2O$$

where M is a cation that is a positively charged ion selected from a metal ion or an organic ion of valence n or hydrogen, x+y is the total number of tetrahedrals per cell, and z is a function of the degree of hydration and varies from 0 to 16.

Metal cations useful in the formation of ZSM-5 molecular sieves include alkali metals or alkaline earth metals. Because of the basic conditions required for crystallization of the aluminosilicate, the source of such a cation usually is a hydroxide, preferably sodium hydroxide. Organic compounds useful in preparing ZSM-5 molecular sieves include alkylammonium cations or precursors such as tetraalkylammonium compounds. Most preferably, it is tetrapropylammonium cations.

The crystalline material can be prepared by mixing a silica source, an alumina source, an alkali metal hydroxide, a nitrogen-containing organic base as template, and water. Preparation of ZSM-5 molecular sieve is described in greater detail in U.S. Pat. Nos. 3,702,886 and Re. 29,948, which are hereby incorporated herein by reference for all purposes. The preferred ZSM-5 crystalline aluminosilicate has a silica-to-alumina ratio of 50:1.

The methane conversion catalyst used in the aromatization process preferably contains a metal component. The preferred metal component is molybdenum or molybdenum compounds. The final methane conversion catalyst preferably contains less than 10 weight % metal as measured on an elemental analysis basis, more preferably from about 0.5 to about 4.0 weight % metal, and most preferably from about 0.5 to about 2.0 weight % metal.

Catalytically active metal may be deposited onto the crystalline aluminosilicate by means of any of the following methods. The catalytically active metal may be added by the incipient wetness impregnation of a water soluble metal salt, such as the ammonium heptamolybdate. Another suitable method is the direct vaporization of the catalytically active metal, such as molybdenum oxide, onto the crystalline aluminosilicate. Other methods as are known in the art may also be used. It is preferred that the catalytically active metal is uniformly distributed throughout the entire network of the final methane conversion catalyst rather than merely on the surface of such catalyst.

The crystalline metal-loaded aluminosilicate may be further admixed with an amorphous silica matrix, depending upon the intended process use. Typically, the surface of the crystalline aluminosilicate is covered with an amorphous silica layer to improve shape selectivity by passivating the external surface of the support which contains acidic sites, coke precursor sites, and non-shape selectivity molybdenum catalyst. The amorphous silica passivating layer has no effect on the accessibility of the pores of the molecular sieve. Amorphous silica layers may be obtained by means of well known techniques as are understood by one skilled in the art. Preferably, said amorphous silica layer is placed on the surface of the crystalline aluminosilicate by means of chemical vapor deposition (CVD) or by means of chemical liquid deposition (CLD) of silicon alkoxides, most preferably tetraethoxysilane. The crystalline aluminosilicate composition that is formed can be separated and recovered by filtration with aqueous washing. Typically, calcination at temperatures ranging from about 350° C. to about 600° C. and preferably from about 450° C. to about 550° C. is necessary to remove organic compounds on the surface of the molecular sieve. The final methane conversion catalyst can be pelletized and thereafter crushed, and the result sieved to 0.250 to 0.425 mm particles.

Within the aromatic production reactor, the reaction zone is maintained at conversion-promoting conditions effective to produce aromatics. The reaction zone is preferably operated at a temperature between about 600° C. and about 800° C., more preferably between about 675° C. and about 750° C. The reaction can takes place at atmospheric pressure, but the pressure is preferably within the approximate range of about 0.5 bar to 5 bar, more preferably between about 0.5 bar and about 2 bar. The reaction is accomplished using a weight hourly space velocity (WHSV) between about 0.1 and about 10 h–1, more preferably between about 0.1 and 4 h–1. This process produces a reaction zone effluent stream comprising methane, hydrogen, and a selectivity to products from C6 to C10 preferably greater than about 30%, more preferably greater than 45%, and most preferably greater than 60%. In an alternative embodiment, a multi-stage process may be employed to convert methane to aromatics.

Further aspects of the aromatic production process employed for the present invention can be found in U.S. patent application Ser. No. 09/916, 469, filed Jul. 27, 2001, entitled "Catalyst and Process for Aromatic Hydrocarbons Production from Methane"; U.S. patent application Ser. No. 10/139,502, filed May 6, 2002, entitled "Non-Oxidative Conversion of Gas to Liquids"; and U.S. patent application Ser. No. 10/139,485, filed May 6, 2002, entitled "Catalyst System and Method for Conversion of Light Hydrocarbons to Aromatics," each of which is incorporated by reference herein in its entirety.

The aforementioned olefin production process utilizing hydrocarbon cracking is known in the art. This process involves the thermal cracking of a variety of hydrocarbons, such as naphtha, gas oil, liquefied petroleum gas (LPG), and light hydrocarbons, to produce olefins such as ethylene and propylene. The effluent from the cracking step, which is known as charge gas or cracked gas, contains a number of products ranging from hydrogen to pyrolysis fuel oil. These products are separated via fractionation into various product and by-product streams, followed by the hydrogenation of at least some of the unsaturated by-products. Further aspects of the hydrocarbon cracking process employed for the present invention can be found in U.S. Pat. No. 5,925,799, incorporated herein by reference in its entirety.

The oxidative dehydrogenation (ODH) process mentioned above involves converting gaseous hydrocarbon gas to primarily olefins. In particular, oxygen ($O_2$) and at least one hydrocarbon, such as ethane and propane that has been separated from other components of a natural gas stream, are fed to an ODH reactor. In the ODH reactor, the hydrocarbon reacts with the $O_2$ in the presence of a catalyst to produce syngas via partial oxidation and olefins via oxidative dehydrogenation. Any suitable reactor configuration that allows contact between the hydrocarbon reactant and the catalyst may be employed for the ODH reactor. One suitable configuration is a fixed catalyst bed in which the catalyst is retained in a fixed arrangement within a reaction zone of the reactor vessel. The catalyst may be employed in the fixed bed regime using well-known fixed bed reaction techniques. Preferably, the ODH reactor is a short-contact time reactor, such as a millisecond contact time reactor. A general description of major considerations involved in operating a reactor using millisecond contact times, e.g., not more than 500 microseconds, is given in U.S. Pat. No. 5,654,491, which is incorporated herein by reference. Additional disclosure regarding suitable ODH reactors and the ODH process is provided in Schmidt et al., *New Ways to Make Old Chemicals*, Vol 46, No. 8 AIChE Journal p. 1492–95 (August 2000); Bodke et al., *Oxidative Dehydrogenation of Ethane at Millisecond Contact Times: Effect of H2 Addition*, 191 Journal of Catalysis p. 62–74 (2000); Iordanoglou et al., *Oxygenates and Olefins from Alkanes in a Single-Gauze Reactor at Short Contact Times*, 187 Journal of Catalysis p. 400–409 (1999); and Huff et al., *Production of Olefins by Oxidative Dehydrogenation of Propane and Butanes over Monoliths at Short Contact Times*, 149 Journal of Catalysis p. 127–141 (1994), each of which is incorporated by reference herein in its entirety.

The ODH reactor contains any suitable catalyst for promoting the conversion of hydrocarbon gas to olefins and syngas. The catalyst preferably resides on a ceramic support composed of an oxide that is stable (i.e., unreactive) at the operating temperature of the ODH reactor, e.g., alumina ($Al_2O_3$). The catalyst may be of any suitable form, including foam, monolith, gauze, spheres, particulates, or the like, for operation at the desired gas velocities with minimal back pressure. The catalyst comprises a catalytically active component, e.g., palladium, platinum, iridium, osmium, nickel, chromium, cobalt, cerium, lanthanum, and mixtures thereof. The particular catalyst used in the ODH reactor can be selected based on whether one desires to maximize syngas production or to maximize olefins production. For example, a catalyst that is capable of maximizing the production of syngas, such as iridium on an alumina ($Al_2O_3$) support, may be disposed within the ODH reactor vessel. Alternatively, a catalyst that is capable of maximizing the production of olefins, such as platinum on an alumina support, may be disposed in the ODH reactor vessel. U.S. Pat. No. 6,072,097 and WO Pub. No. 00/43336 describe the use of platinum and chromium oxide-based monolith ODH catalysts for ethylene production with SCTRs; and U.S. Pat. No. 6,072,097 describes the use of Pt-coated monolith ODH catalysts for use in SCTRs, each of these references being incorporated by reference herein in its entirety.

Within the ODH reactor, the reaction zone is maintained at conversion-promoting conditions effective to produce olefins and syngas comprising H2 and CO. The operating conditions of the ODH reactor may be optimized to maximize syngas production and minimize olefins production, or vice versa. Preferably, the process is operated at atmospheric or super atmospheric pressures, the latter being preferred. The pressures may range from about 100 kPa to about 12,500 kPa, preferably from about 130 kPa to about 5,000 kPa. The catalyst temperatures may range from about 400° C. to about 1200° C., preferably from about 500° C. to about 900° C. The gas hourly space velocity for the process ranges from about 20,000 to at least about 100,000,000 NL/L/h, preferably from about 500,000 to about 5,000,000 NL/L/h. Residence time is inversely proportional to space velocity, and high space velocity indicates low residence time on the catalyst. In a preferred millisecond contact time reactor, the residence time of the reactant gas mixture with the ODH catalyst is no more than about one second.

Further aspects of the ODH process employed for the present invention can be found in Published U.S. patent application Ser. No. 2003-0040655; and U.S. patent application Ser. No. 60/346,573, filed Jan. 4, 2002, entitled "Integrated Oxidative Dehydrogenation/Carbon Filament Production Process and Reactor Therefor," each of which is incorporated by reference herein in its entirety.

A suitable dehydrogenation process for use as one of the auxiliary $H_2$/CO sources 52 is a catalytic dehydrogenation process for producing light olefins from their corresponding paraffins, e.g., the production of propylene from propane. An example of such a dehydrogenation process is the Oleflex™ process of UOP LLC of Des Plaines, Ill. Further aspects of the Oleflex™ process can be found in *Oleflex™ Process for Propylene Production*. 1998. http://www.uop.com/techsheets/oleflex.pdf, which is incorporated by reference herein in its entirety.

Suitable petroleum refining processes for use as auxiliary $H_2$/CO sources 52 are disclosed in Meyers, Robert A. Ed. 2nd ed. *Handbook of Petroleum Refining Processes*. McGraw-Hill, 1996; Magee, John and Dolbear, Geoffrey. *Petroleum Catalysis in Nontechnical Language*. Pennwell Publishing Company, 1998; and Gary, James H. and Handwerk, Glenn E. Ed. 3rd ed. *Petroleum Refining Technology and Economics*. Marcel Dekker, Inc., 1994, each of which is incorporated by reference herein in its entirety.

Referring again to FIG. 2, an effluent stream 54 recovered from one or more of the auxiliary $H_2$ and/or CO sources 52 may be subjected to a separation process 56 to form a hydrogen rich stream 58 and a carbon monoxide rich stream 60 as well as other product streams (not shown). Separation process 56 may include known separation units such as a PSA separation unit and a membrane separation unit. In the case where a secondary syngas production process serves as an auxiliary source of $H_2$ and CO, separation process 56 preferably includes a WGS reactor and a $CO_2$ removal process for separating the $H_2$ from other components in the output of the syngas production process. Other suitable separation techniques would be known to those skilled in the art.

Hydrogen rich stream 58 comprises preferably greater than about 50 volume % $H_2$, more preferably greater than about 70 volume. % $H_2$, and most preferably greater than about 90 volume % $H_2$, based on the total volume of the stream. Hydrogen rich stream 58 is substantially free of $CO_2$, meaning that it comprises less than about 10% $CO_2$ by volume, preferably less than about 5% $CO_2$ by volume. Where additional $H_2$ is needed to raise the $H_2$/CO ratios of syngas streams 14 and/or 18, hydrogen rich stream 58 may be supplied thereto, as shown via the connection of stream 58 to stream 46. On the other hand, if additional CO is needed to decrease the $H_2$/CO ratios of syngas streams 14 and/or 18, carbon monoxide rich stream 60 may be passed to those streams via stream 62.

While FIG. 2 depicts $H_2$ or CO from multiple sources being fed to a synthesis process, e.g., an FT process, a person skilled in the art would understand that the number of sources being used therein (both primary and auxiliary) may be varied to meet the desired $H_2$/CO ratios. For example, $H_2$ and/or CO rich streams from one or more WGS/CO$_2$ removal processes 44; one or more separation processes 66; one or more auxiliary H$_2$/CO sources 52; or combinations thereof (collectively referred to as auxiliary sources) may be used alone or in combination to adjust the H$_2$/CO ratios in streams 14 and 18. Also, hydrogen rich streams 46, 58, and/or 68; carbon monoxide rich streams 70 and/or 62; or combinations thereof may also be introduced to syngas streams 14 and/or 18 in the case where the synthesis process is a process other than an FT process, e.g., a methanol process.

While the preferred embodiments of the invention have been shown and described, modifications thereof can be made by one skilled in the art without departing from the spirit and teachings of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A process for producing hydrocarbons, comprising:
   (a) producing a synthesis gas stream in a syngas production process where inlet materials to the syngas production process are substantially free of carbon dioxide, and wherein the synthesis gas comprises primarily hydrogen and carbon monoxide;
   (b) forming a reactant-stream for a hydrocarbon synthesis process comprising at least a portion of the synthesis gas from step (a), wherein the ratio of hydrogen to carbon monoxide in the reactant-stream is not preferred for synthesis to hydrocarbons such that one component is a lean component;
   (c) providing from a feedstock which is substantially free of carbon dioxide a second stream which is rich in the lean component of the hydrocarbon synthesis process reactant-stream of step (b);
   (d) adding an amount of said second stream to the reactant-stream to form an adjusted reactant-stream which has a hydrogen to carbon monoxide ratio more desirable for hydrocarbon synthesis;
   (e) catalytically converting the adjusted reactant-stream from step (d) in a synthesis reaction to produce hydrocarbons.

2. The process according to claim 1, wherein the step (e) of catalytically converting the adjusted reactant-stream comprises Fischer-Tropsch synthesis conducted in one or more Fischer-Tropsch reactors, and wherein at least one Fischer-Tropsch reactor produces an FT gas effluent comprising un-reacted synthesis gas, and wherein the FT gas effluent is optionally subjected again to catalytic conversion conditions for Fischer-Tropsch synthesis in a Fischer-Tropsch reactor.

3. The process according to claim 2 wherein the reactant-stream of step (b) comprises FT gas effluent.

4. The process according to claim 2 wherein the FT gas effluent from one Fischer-Tropsch reactor is directed to a second Fischer-Tropsch reactor.

5. The process according to claim 4 wherein a second reactant-stream is formed for the second Fischer-Tropsch reactor and the second reactant-stream comprises at least one of:
   (a) synthesis gas from the syngas production process; and
   (b) the FT effluent from the one Fischer-Tropsch reactors; and the process further comprises adding an amount of said second stream to said second reactant-stream to create a second adjusted reactant-stream that is more preferable for Fischer-Tropsch synthesis.

6. The process according to claim 2 wherein the FT gas effluent is recycled back into the same Fischer-Tropsch reactor from which it exited.

7. The process according to claim 1 further comprising the step of upgrading the hydrocarbons produced in step (e) into hydrocarbon products.

8. A process for producing hydrocarbons, comprising:
   (a) producing a synthesis gas stream in a syngas production process where inlet materials to the syngas production process are substantially free of carbon dioxide, wherein the synthesis gas comprises primarily hydrogen and carbon monoxide;
   (b) dividing the synthesis gas stream from step (a) into at least a first syngas stream and a second syngas stream;
   (c) forming a reactant-stream for a hydrocarbon synthesis process comprising at least a portion of the synthesis gas from step (a) wherein the ratio of hydrogen to carbon monoxide in the reactant-stream is not preferred for synthesis to hydrocarbons such that one component is a lean component;
   (d) processing the second syngas gas stream to create a third syngas stream which is rich in the component in which the first syngas stream is lean;
   (e) adding an amount of the third syngas stream to the reactant-stream to form an adjusted reactant-stream which has a hydrogen to carbon monoxide ratio more desirable for hydrocarbon synthesis; and
   (f) catalytically converting the adjusted reactant-stream from step (e) in a synthesis reaction to produce hydrocarbons.

9. The process according to claim 8, wherein the step (d) of processing the second syngas stream comprises separating the synthesis gas into a hydrogen-rich stream and a carbon monoxide rich stream wherein one of the hydrogen-rich and carbon monoxide rich stream comprises the third syngas stream.

10. The process according to claim 9, wherein the step (d) of processing the second syngas stream comprises separating with one of: a membrane separator; cryogenic separator; and pressure swing adsorber.

11. The process according to claim 8, wherein the synthesis gas of step (a) is further defined by being hydrogen lean and further wherein the step (d) of processing the second syngas stream comprises a water-gas-shift reaction for reacting the second syngas stream with water, and optionally an amine-based carbon dioxide removal process, to form a hydrogen-rich stream and the hydrogen-rich stream comprises the third syngas stream.

12. The process according to claim 8, wherein the step (f) of catalytically converting the adjusted reactant-stream comprises Fischer-Tropsch synthesis conducted in one or more Fischer-Tropsch reactors and wherein at least one Fischer-Tropsch reactor produces an FT gas effluent comprising un-reacted synthesis gas and wherein FT gas effluent exiting a Fischer-Tropsch reactor is optionally subjected again to catalytic conversion conditions for Fischer-Tropsch synthesis in a Fischer-Tropsch reactor.

13. The process according to claim 12 wherein the reactant-stream of step (c) comprises FT gas effluent.

14. The process according to claim 12 wherein the FT gas effluent from one Fischer-Tropsch reactor is directed to a second Fischer-Tropsch reactor.

15. The process according to claim 12 wherein the FT gas effluent is recycled back into the same Fischer-Tropsch reactor from which it exited.

16. The process according to claim 8 further comprising the step of refining the hydrocarbons produced in step (f) into hydrocarbon products.

17. A process for producing hydrocarbons, comprising:
(a) producing a synthesis gas stream in a catalytic partial oxidation process, wherein the synthesis gas stream comprises primarily hydrogen and carbon monoxide;
(b) forming a reactant-stream for a hydrocarbon synthesis process comprising at least a portion of the synthesis gas from step (a) wherein the ratio of hydrogen to carbon monoxide in the reactant-stream is less than that preferred for synthesis to hydrocarbons and hydrogen is the lean component;
(c) adding an amount of an auxiliary gas stream which is rich in hydrogen to the reactant-stream to form an adjusted reactant-stream which has a hydrogen to carbon monoxide ratio more desirable for hydrocarbon synthesis;
(d) catalytically converting the adjusted reactant-stream from step (c) in a synthesis reaction to produce hydrocarbons.

18. The process according to claim 17, wherein the step (d) of catalytically converting the adjusted reactant-stream comprises Fischer-Tropsch synthesis conducted in one or more Fischer-Tropsch reactors and wherein at least one Fischer-Tropsch reactor produces an FT gas effluent comprising un-reacted synthesis gas and wherein FT gas effluent exiting a Fischer-Tropsch reactor is optionally subjected again to catalytic conversion conditions for Fischer-Tropsch synthesis in a Fischer-Tropsch reactor.

19. The process according to claim 18 wherein the reactant-stream of step (b) comprises FT gas effluent.

20. The process according to claim 18 wherein the FT gas effluent from one Fischer-Tropsch reactor is directed to a second Fischer-Tropsch reactor.

21. The process according to claim 18 wherein the FT gas effluent is recycled back into the same Fischer-Tropsch reactor from which it exited.

22. The process according to claim 17 wherein the auxiliary gas stream is derived from a least one of the following:
(a) a process for converting hydrocarbons to synthesis gas;
(b) a process for converting hydrocarbons to olefins;
(c) a process for converting hydrocarbons to aromatics;
(d) a process for catalytically dehydrogenating hydrocarbons;
(e) a process for catalytically cracking hydrocarbons;
(f) a process for refining petroleum; and
(g) a process for converting hydrocarbons to carbon filaments.

23. The process according to claim 17 further comprising the step of upgrading the hydrocarbons produced in step (d) into hydrocarbon products.

24. The process according to claim 22 further comprising subjecting the synthesis gas produced in step (a) to a water-gas-shift reaction.

25. A process for operating a hydrocarbon synthesis reactor within a hydrocarbon production system, wherein the process comprises the steps of:
(a) forming a reactant-stream for the hydrocarbon synthesis reactor from at least one of:
(1) synthesis gas made in a process which is substantially free of carbon dioxide at the inlet;
(2) effluent gas from at least one other synthesis reactor;
wherein the ratio of hydrogen to carbon monoxide in the reactant-stream is not preferred for synthesis to hydrocarbons such that one component is a lean component;
(b) adding an amount of a feedstock which is rich in the lean component to the reactant-stream to form an adjusted reactant-stream which has a hydrogen to carbon monoxide ratio more desirable for hydrocarbon synthesis;
(c) catalytically converting the adjusted reactant-stream from step (b) in a synthesis reaction to produce hydrocarbons.

26. The process according to claim 25 wherein the reactant-stream further comprises effluent gas recycled from the hydrocarbon synthesis reactor.

27. A process for operating a plurality of hydrocarbon synthesis reactors that catalytically convert synthesis gas, comprising primarily hydrogen and carbon monoxide, to hydrocarbons in a hydrocarbon synthesis production system, wherein the process comprises the steps of:
(a) forming a reactant-stream for each hydrocarbon synthesis reactor from at least one of:
(1) synthesis gas made in a process which is substantially free of carbon dioxide at the inlet;
(2) effluent gas from at least one other synthesis reactor;
wherein one reactant-stream is a deficient-stream in that the ratio of hydrogen to carbon monoxide is not preferred for hydrocarbon synthesis and one component in the deficient-stream is a lean component;
(b) adding an amount of a feedstock which is rich in the lean component to the deficient-stream to form an adjusted reactant-stream which has a hydrogen to carbon monoxide ratio more desirable for hydrocarbon synthesis; and
(c) catalytically converting the reactant-streams in synthesis reactions to produce hydrocarbons.

28. The process according to claim 27 wherein the reactant-streams in step (a) optionally comprise effluent gas recycled from the hydrocarbon synthesis reactor.

29. The process according to claim 28, wherein the step (c) of catalytically converting the reactant-streams comprises Fischer-Tropsch synthesis reactions.

30. The process according to claim 29 wherein a plurality of deficient-streams are formed and the process further comprises adding to at least a second deficient-stream an amount of a feedstock which is rich in the lean component to form adjusted reactant-streams which are more preferable for hydrocarbon synthesis.

31. The process according to claim 27 wherein a plurality of deficient-streams are formed and the process further comprises adding to at least a second deficient-stream an amount of a feedstock which is rich in the lean component to form adjusted reactant-streams which are more preferable for hydrocarbon synthesis.

* * * * *